(12) United States Patent
Horng et al.

(10) Patent No.: US 6,407,473 B1
(45) Date of Patent: Jun. 18, 2002

(54) POSITIONING DEVICE FOR A SENSOR ELEMENT OF A MINIATURE FAN

(75) Inventors: Alex Horng; Ching-Shen Horng, both of Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/563,954

(22) Filed: May 2, 2000

(51) Int. Cl.[7] .......................... H02K 11/00; H02K 7/14; H02K 15/02; H02K 21/22

(52) U.S. Cl. ................... 310/68 B; 310/67 R; 310/42; 310/164

(58) Field of Search .................. 310/68 B, 67 R, 310/162, 164, 62, 63, 42; 417/423.7

(56) References Cited

U.S. PATENT DOCUMENTS

| | | | |
|---|---|---|---|
| 4,429,263 A | | 1/1984 | Müller ........................ 318/254 |
| 4,547,714 A | | 10/1985 | Müller ........................ 318/254 |
| 4,806,808 A | * | 2/1989 | Grecksch et al. ............. 310/71 |
| 4,899,075 A | * | 2/1990 | Hasebe ........................ 310/257 |
| 5,093,599 A | * | 3/1992 | Horng .......................... 310/254 |
| 5,245,236 A | * | 9/1993 | Horng ...................... 310/67 R |
| 5,539,263 A | * | 7/1996 | Lee ........................... 310/67 R |
| 5,744,893 A | * | 4/1998 | Zhao et al. .................. 310/259 |
| 5,859,487 A | * | 1/1999 | Chen ........................... 310/254 |
| 5,917,262 A | * | 6/1999 | Huang et al. ................ 310/254 |
| 5,962,938 A | * | 10/1999 | Bobay et al. ............. 310/67 R |
| 5,967,763 A | | 10/1999 | Horng ...................... 417/423.7 |
| 5,986,379 A | * | 11/1999 | Hollenbeck et al. ......... 310/257 |
| 6,109,892 A | | 8/2000 | Horng ........................ 310/68 B |
| 6,114,785 A | * | 9/2000 | Horng ........................ 310/68 B |

* cited by examiner

Primary Examiner—Tran Nguyen
(74) Attorney, Agent, or Firm—Bacon & Thomas

(57) ABSTRACT

A positioning device includes an axle tube for engaging with a circuit board and a stator. The circuit board includes control elements and a sensor element thereon. Each pole of the stator includes two pole ends. A gap exists between two adjacent pole ends respectively of two adjacent poles. The gap receives the sensor element or provides a positioning reference for the sensor element.

8 Claims, 3 Drawing Sheets

POSITIONING DEVICE FOR A SENSOR ELEMENT OF A MINIATURE FAN

BACKGROUND OF THE INVENTION

1. Field of the Invention

The present invention relates to a positioning device for a sensor element of a miniature fan, and more particularly to a positioning device for positioning a sensor element of a miniature fan to minimize thickness of the miniature fan and to locate the sensor element in an optimal position for detection.

2. Description of the Related Art

It is known to use a sensor element for detecting polarity of the rotor of a miniature fan, thereby sending signals to change polarity of the stator winding for providing alternating magnetic fields. The miniature fan may retain the best operational quality if the sensor element can be located in the optimal position relative to the stator magnetic poles.

U.S. Pat. No. 5,967,763 issued to Horng on Oct. 19, 1999 disclose optimal positioning devices for a sensor element of a miniature fan, wherein the sensor element mounted on a circuit board is located on a vertical line extending from one of the first end edge and the second end edge of one of the poles of the coil seat. Miniaturization is a trend in miniature fans. The above-mentioned positioning devices may provide required positioning effect for the sensor element for providing improved operational effect, but the overall thickness of the resultant miniature fan cannot be further reduced. In addition, if the thickness of the miniature fan is further reduced, the positioning uniformity for the sensor element relative to front end edge or rear end edge of magnetic poles of the stator becomes relatively difficult.

SUMMARY OF THE INVENTION

It is an object of the present invention to provide a positioning device for a sensor element of a miniature fan in which the sensor element can be easily and conveniently engaged and fixed in an optimal detecting position relative to the stator poles, thereby providing improved operational effect for the miniature fan. The quality of the produced miniature fans is more consistent.

It is a second object of the present invention to provide a positioning device for a sensor element of a miniature fan, wherein the overall thickness of the miniature fan is relatively small after engagement of the sensor element, thereby providing a super thin miniature fan for market needs.

A positioning device in accordance with the present invention includes an axle tube for engaging with a circuit board and a stator. The circuit board includes control elements and a sensor element thereon. Each pole of the stator includes two pole ends. A gap exists between two adjacent pole ends respectively of two adjacent poles. The gap receives the sensor element or provides a positioning reference for the sensor element.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 1:
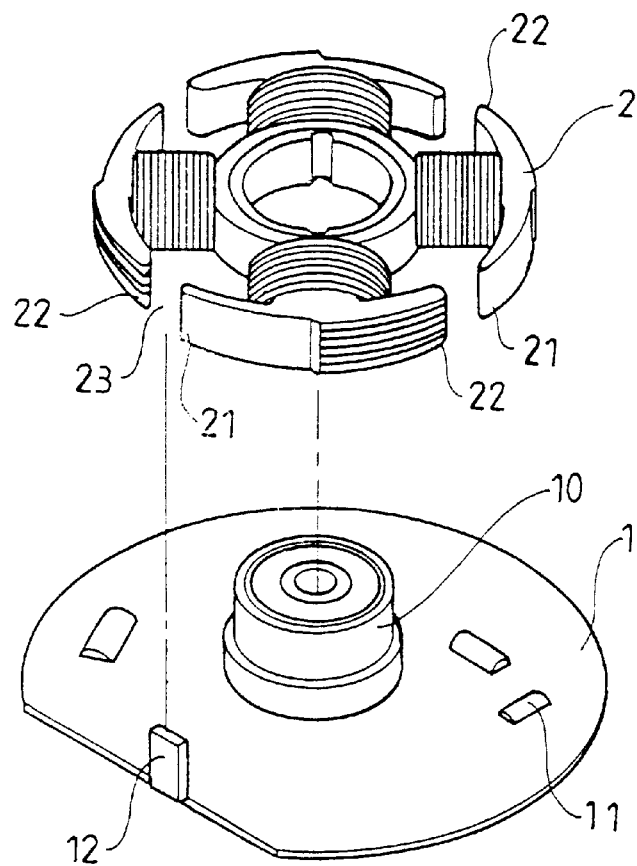
FIG. 1 is an exploded perspective view of a first embodiment of a positioning device for a sensor element of a miniature fan in accordance with the present invention.
Figure 2:
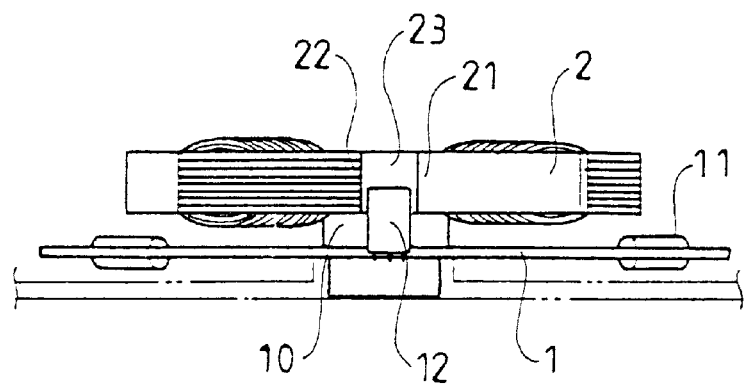
FIG. 2 is a side view of the positioning device in FIG. 1.

Referring to FIGS. 1 and 2, a first embodiment of a positioning device for a sensor element of a miniature fan in accordance with the present invention generally includes a circuit board 1 and a stator 2.

The circuit board 1 may be of any conventional structure and includes necessary control elements 11. An axle tube 10 is provided on the circuit board 1. The axle tube 10 may be a tube that extends through a central hole (not shown) of the circuit board 1 or an axle tube formed on a housing (not shown) of a miniature fan (not shown). The axle tube 10 provides engagement for the circuit board 1 and the stator 2 and supports a shaft of a rotor for rotation. The circuit board 1 further includes a sensor element 12 that is upright in this embodiment.

The stator 2 may be of any conventional structure. In this embodiment, the stator 2 includes radial windings and includes four poles each having two pole ends 21 and 22. In two adjacent poles, the pole end 21 of one pole and the pole end 22 of the other pole have a gap 23 therebetween. The gap 23 has a width that is slightly greater than that of the sensor element 12, thereby allowing insertion of the sensor element 12 into the gap 23.

FIG. 2 illustrates assembly of the first embodiment of the positioning device in accordance with the present invention, wherein the sensor element 12 on the circuit board 1 is aligned with the gap 23 between two adjacent poles ends respectively of two adjacent poles. In addition, the sensor element 12 may be inserted into the gap 23, such that the overall thickness for the circuit board 1 and the stator 2 is minimized after assembly.

Figure 3:
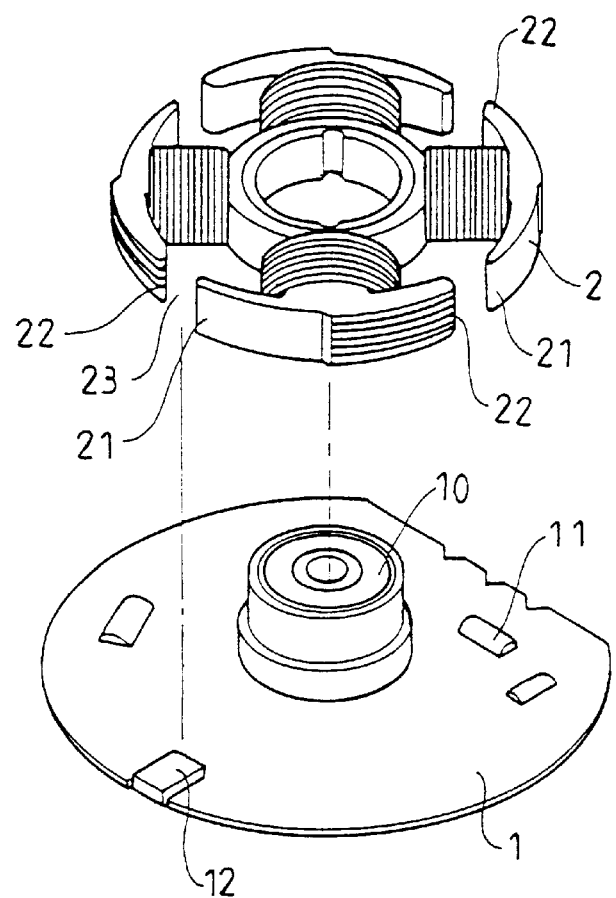
FIG. 3 is an exploded perspective view of a second embodiment of the positioning device for a sensor element of a miniature fan in accordance with the present invention.
Figure 4:
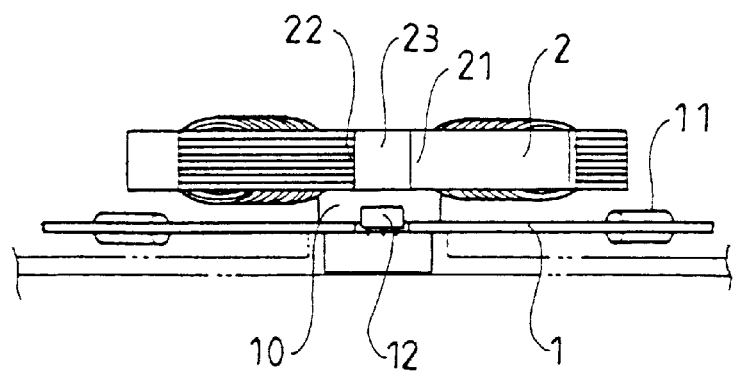
FIG. 4 is a side view of the positioning device in FIG. 3.

FIGS. 3 and 4, illustrate a second embodiment of the positioning device in accordance with the present invention that is substantially identical to the first embodiment. The only difference between the two embodiments is that the sensor element 12 in the second embodiment lies horizontally to further minimize the overall thickness for the circuit board 1 and the stator 2 after assembly. In addition, relative position for the stator poles and the sensor element 12 is more consistent so as to retain the sensor element 12 in the optimal detecting position.

Figure 5:
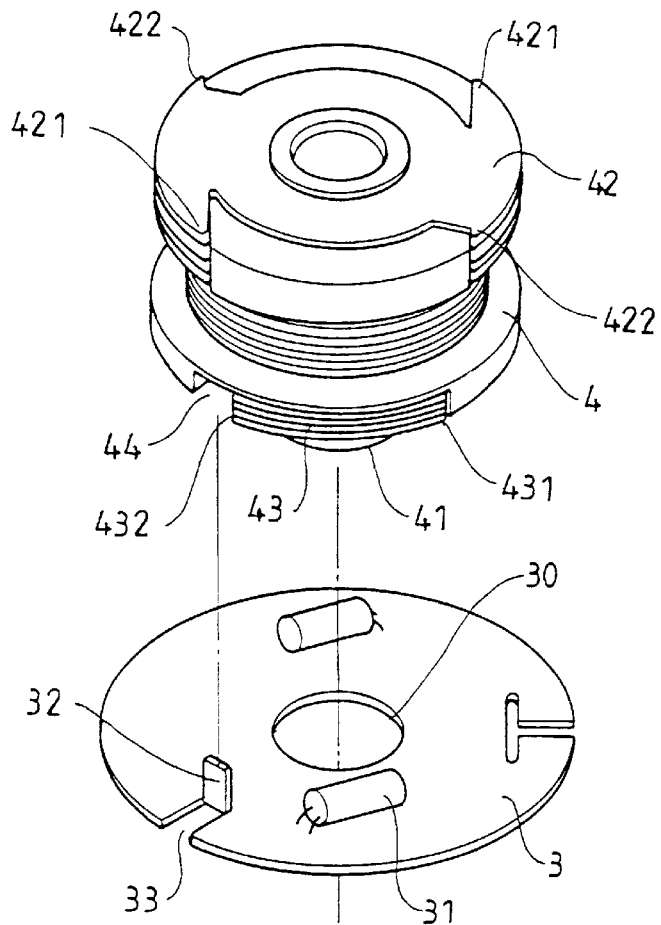
FIG. 5 is an exploded perspective view of a third embodiment of the positioning device for a sensor element of a miniature fan in accordance with the present invention.
Figure 6:
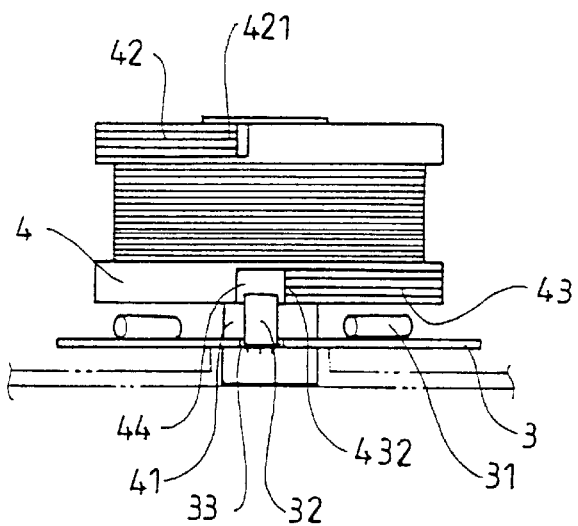
FIG. 6 is a side view of the positioning device in FIG. 5.

FIGS. 5 and 6 illustrate a third embodiment of the positioning device in accordance with the present invention. In this embodiment, the positioning device includes a circuit board 3 and a stator 4. The circuit board 3 includes an axle hole 30 through which an axle tube 41 on the stator 4 extends. The circuit board 3 includes conventional control elements 31 and a sensor element 32. If necessary, the circuit board 3 may include a notch 33 to allow insertion of the sensor element 32, thereby further minimizing the overall thickness after assembly.

The stator 4 in this embodiment is a stator having axial windings. The stator 4 includes an upper pole plate 42 and a lower pole plate 43 that are located on different planes. The axle tube 41 is used to engage with the circuit board 3, the upper pole plate 42, and the lower pole plate 43. However, the axle tube 41 may be directly formed on a housing (not shown) of a miniature fan (not shown). The upper pole plate 42 includes two poles each having two pole ends 421 and 422. The lower pole plate 43 includes two poles each having two pole ends 431 and 432. The pole ends 421 and 422 of the upper pole plate 42 are misaligned with the pole ends 431 and 432 of the lower pole plate 42. Namely, a gap 44 is defined in a vertical direction between the pole end 421 of the upper pole plate 42 and the pole end 432 of the lower pole plate 43. The gap 44 provides an alignment reference for the sensor element 32. If necessary, the sensor element 32 may be inserted into the gap 44 to further minimize the overall thickness after assembly.

According to the above description, it is appreciated that the sensor element can be easily fixed in an optimal detecting position relative to the stator poles by providing the positioning devices in accordance with the present invention, thereby providing consistent operational effect for the miniature fans so constructed. In addition, the miniature fans so constructed have a minimized thickness.

Although the invention has been explained in relation to its preferred embodiment as mentioned above, it is to be understood that many other possible modifications and variations can be made without departing from the spirit and scope of the invention. It is, therefore, contemplated that the appended claims will cover such modifications and variations that fall within the true scope of the invention.

What is claimed is:

1. A positioning device for a miniature fan, comprising:
   a circuit board including control elements and a sensor element thereon;
   a stator including at least two poles each having a radial winding thereon, each said pole having a first pole end and a second pole end, the first pole end of one of the poles and the second pole end of an adjacent said pole having a gap therebetween, the gap having a width that is slightly greater than that of the sensor element, the sensor element extending into the gap; and
   an axle tube extending through the circuit board and the stator.

2. The positioning device for a miniature fan as claimed in claim 1, wherein the sensor element is inserted into the gap.

3. The positioning device for a miniature fan as claimed in claim 1, wherein the sensor element lies horizontally.

4. The positioning device for a miniature fan as claimed in claim 1, wherein the circuit board includes a notch to allow insertion of the sensor element.

5. A positioning device for a miniature fan, comprising:
   a circuit board including control elements and a sensor element thereon;
   a stator including axial windings, an upper pole plate, and a lower pole plate, the upper pole plate including at least two poles each having two pole ends, the lower pole plate including at least two poles each having two pole ends, two adjacent pole ends respectively of the upper pole plate and the lower pole plate being misaligned with each other in a vertical direction to form a gap having a width that is slightly greater than that of the sensor element, the sensor element extending into the gap; and
   an axle tube extending through the circuit board and the stator.

6. The positioning device for a miniature fan as claimed in claim 5, wherein the sensor element is inserted into the gap.

7. The positioning device for a miniature fan as claimed in claim 5, wherein the sensor element lies horizontally.

8. The positioning device for a miniature fan as claimed in claim 5, wherein the circuit board includes a notch to allow insertion of the sensor element.

* * * * *